United States Patent [19]

Steffes

[11] 4,263,784
[45] Apr. 28, 1981

[54] POWER BRAKE UNIT FOR AUTOMOTIVE VEHICLES

[75] Inventor: Helmut Steffes, Eschborn, Fed. Rep. of Germany

[73] Assignee: ITT Industries, Inc., New York, N.Y.

[21] Appl. No.: 39,622

[22] Filed: May 16, 1979

[30] Foreign Application Priority Data

Jun. 3, 1978 [DE] Fed. Rep. of Germany ....... 2824458

[51] Int. Cl.³ ............................................. B60T 13/00
[52] U.S. Cl. .................................. 60/547 R; 60/550; 60/581; 60/582
[58] Field of Search ................... 60/547 R, 548, 550, 60/551, 576, 581, 582

[56] References Cited

U.S. PATENT DOCUMENTS

| 2,945,352 | 7/1960 | Stelzer ................................... 60/550 |
| 3,298,177 | 1/1967 | Kellogg ................................... 60/548 |
| 3,334,548 | 8/1967 | Van House ............................. 60/550 |
| 4,137,718 | 2/1979 | Belart ..................................... 60/562 |
| 4,181,064 | 1/1980 | Flory ...................................... 60/582 |

FOREIGN PATENT DOCUMENTS 2460529  7/1975  Fed. Rep. of Germany.

Primary Examiner—Abraham Hershkovitz
Attorney, Agent, or Firm—John T. O'Halloran; Alfred C. Hill

[57] ABSTRACT

A power brake unit for automotive vehicles includes a brake valve to meter brake fluid from an auxiliary fluid source into a booster chamber to act upon a booster piston arrangement. The booster piston arrangement includes a first booster piston and a second booster piston, the latter being held in an operative position by the fluid from the auxiliary fluid source and being inoperative in the event of failure of the auxiliary fluid source. If the auxiliary fluid source fails, the brake pedal force is directly and mechanically transmitted from the brake pedal to the master cylinder piston.

9 Claims, 1 Drawing Figure

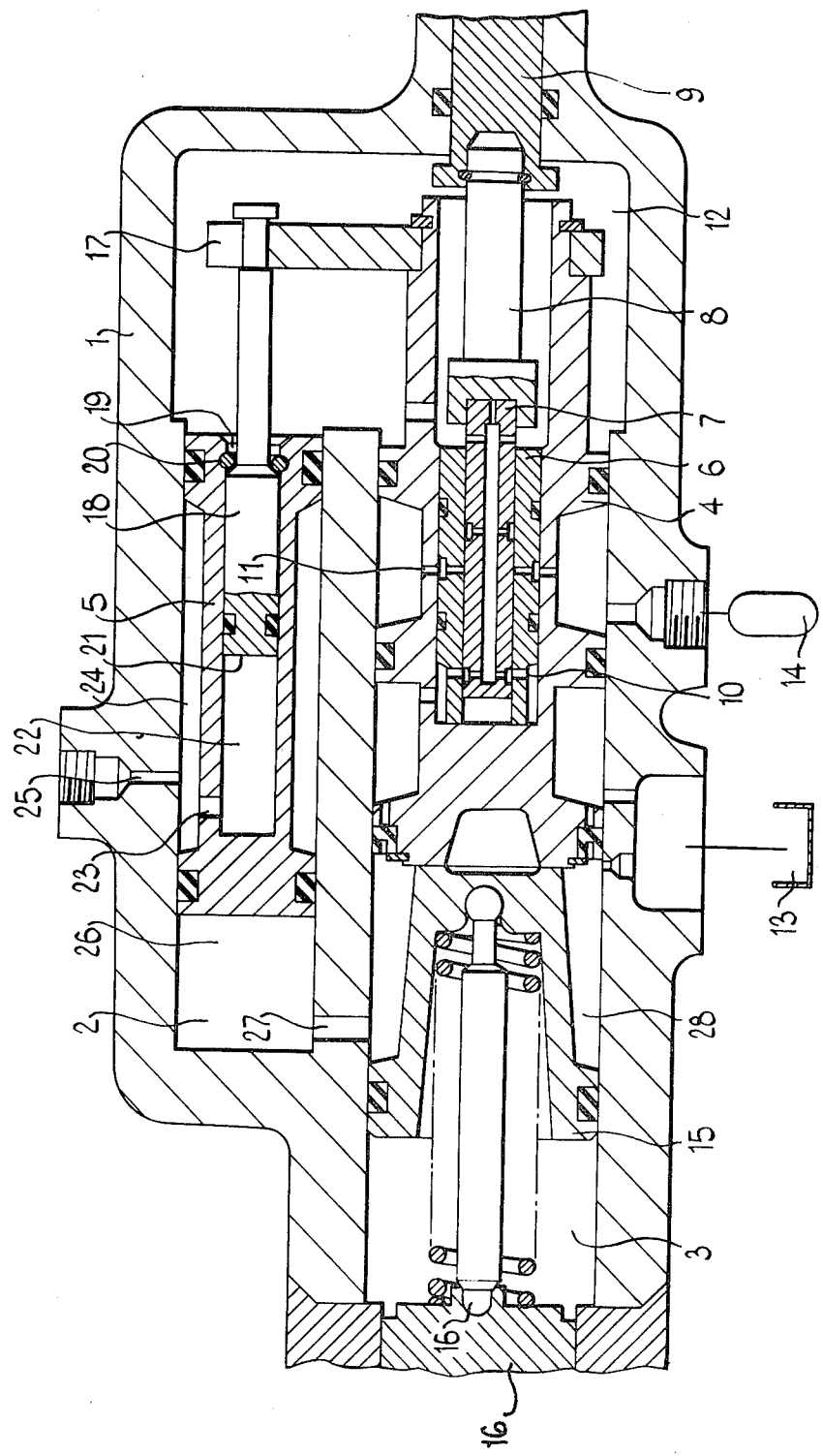

POWER BRAKE UNIT FOR AUTOMOTIVE VEHICLES

BACKGROUND OF THE INVENTION

This invention relates to a power brake unit for automotive vehicles including a brake valve which is adapted to meter pressure transmitting fluid from an auxiliary energy source into a booster chamber which is isolated from an intermediate pressure chamber by an axially displaceable booster piston arrangement, the other side of the intermediate pressure chamber being bounded by a master cylinder piston or an intermediate piston coupled thereto, with a hydraulic transmission ratio which is effective between the brake pedal and the master cylinder piston being disconnectible dependent on the pressure of the auxiliary energy source.

A brake booster of this type is described in German Patent DE-OS 2,460,529.

By selecting a high pressure in the auxiliary energy source and suitably dimensioning the effective surfaces of the booster piston arrangement, it is possible to achieve a high brake boosting action with power brake units of this type without entailing great expense. The power brake unit is therefore particularly suitable for use in heavy duty vehicles. The disconnectible hydraulic transmission ratio serves to modify the transmission ratio between brake pedal and master cylinder piston if the auxiliary energy fails because of a defect. This is necessary to enable a brake pressure as high as possible to be built up with a relatively low pedal force and without the assistance of the auxiliary energy, utilizing the maximum permissible pedal travel. With the transmission ratio constant in a brake system designed for operation without auxiliary energy, the additional action of the auxiliary energy would cause the pedal to be stepped down to the floorboard of the vehicle so that a further pressure build-up would be prevented as a result of the blocked pedal travel.

The disconnectible transmission ratio is embodied in the power brake unit of the above cited German Patent by arranging for the booster piston to have its effective surface adjacent the master cylinder piston in an intermediate pressure chamber, this surface being of a cross section larger than the effective surface of the master cylinder piston facing it, and by arranging for the intermediate pressure chamber to be connectible with the working chamber in from of the master cylinder piston through a valve arrangement.

Disadvantages of this power brake unit are that the valve arrangement necessary for connecting and disconnecting the hydraulic transmission ratio necessitates substantial additional costs and the valve arrangement may be the cause of a failure of the power brake unit by remaining in a permanently open or closed position because of a defect. If such a defect occurs, sufficient deceleration of the vehicle is no longer possible using the pedal force alone when the auxiliary energy has failed, or, in the presence of the auxiliary energy, the brake pedal travels down to the floorboard, thereby limiting the further build-up of pressure.

SUMMARY OF THE INVENTION

It is an object of the present invention to provide a power brake unit of the type initially referred to wherein the transmission ratio between brake pedal and master cylinder piston is changed automatically in the event of a failure of the auxiliary energy without requiring a valve arrangement.

A feature of the present invention is the provision of a power brake unit for automotive vehicles being activated by a brake pedal and acting upon a master cylinder piston, the unit comprising: a booster piston arrangement axially displaceable in a housing containing a brake valve to meter pressure transmitting fluid from an auxiliary energy source into a booster chamber disposed at one end of the arrangement adjacent the brake pedal, the other end of the arrangement providing a boundary for an intermediate pressure chamber being bounded remote from the other end of the arrangement by one of the master cylinder piston and an intermediate piston disposed between the arrangement and the master cylinder piston; the arrangement having a hydraulic transmission ratio which is effective between the brake pedal and the master cylinder piston and being disconnectible dependent on the pressure of the auxiliary energy source; and the arrangement including a first booster piston, and a second booster piston axially slidable relative to the first booster piston, the relative sliding motion being limited in a direction opposite to the actuating direction of both the first and second booster pistons by a stop disposed in the second booster piston, the second booster piston being held at a maximum axial distance from the first booster piston in the actuating direction of both the first and second booster pistons by a pressure chamber formed in the second booster piston connected to the auxiliary energy source.

In a power brake unit constructed in this manner, the two booster pistons are rigidly coupled to each other by the pressure of the auxiliary energy source, so that both booster pistons displace pressure transmitting fluid when the brake is applied. In the event of failure of the auxiliary energy, the second booster piston is disengaged and displacement of the master cylinder piston is then possible with the first booster piston alone. The second booster piston is able to lie still without this requiring unseating or seating of any pilot valve from or onto a valve seat. Thus, the arrangement of the present invention achieves the same function as the power brake unit disclosed in the above-cited German Patent without, however, requiring the use of a pilot valve. Accordingly, the power brake unit of the present invention is simpler than the known power brake unit. This simpler design results at the same time in an increased reliability of operation which is of utmost importance for power brake units.

In an advantageous embodiment of the invention, the second booster piston is disposed parallel to the first booster piston. This embodiment affords a particularly simple design.

Particularly suitable from the point of view of design is another advantageous embodiment wherein the second booster piston is a cup-shaped piston into which an auxiliary piston rigidly connected with the first booster piston projects, and wherein the pressure chamber in front of the end surface of the auxiliary piston in the interior of the second booster piston is in permanent fluid connection with the auxiliary energy source, and a stop of the second booster piston is in abutment with a collar of the auxiliary piston in its extended position relative to the auxiliary piston.

If in another embodiment of the invention the first booster piston has the same diameter as the master cylinder piston, it is ensured that the first booster piston remains always in abutment with the master cylinder piston in the event of failure of the auxiliary energy source. It is thereby possible to displace the master cylinder piston by means of the brake pedal mechanically through the first booster piston.

Another advantage is to couple the master cylinder piston with an intermediate piston arranged close to the first booster piston, the diameter of the intermediate piston being greater than that of the master cylinder piston and equal to that of the first booster piston. By this design another pressure transmission ratio occurs between the booster piston and the master cylinder piston. In addition, an isolation of fluid media takes place between the pressure transmitting fluid provided for the actuation of the brake valve and the brake fluid in the master cylinder and the brake system.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a longitudinal cross-sectional view of a power brake unit according to the principles of the present invention.

DESCRIPTION OF THE PREFERRED EMBODIMENT

The FIGURE shows a housing 1 including two parallel bores 2 and 3. Bore 3 accommodates therein an axially slidable first booster piston 4. Bore 2 accommodates a second booster piston 5 which is likewise axially slidable. Booster pistons 4 and 5 combine to form a booster piston arrangement.

First booster piston 4 houses a control casing 6 into which a valve spool 7 projects. Valve spool 7 is connected with a brake pedal (not shown) through an adapted 8 and a tappet 9.

Depression of the brake pedal causes tappet 9 and adapter 8 and thus also valve spool 7 to be shifted to the left when viewing the drawing, so that in the conventional manner first a return port 10 is closed and then a fluid port 11 is opened. As a result of this sequence of operation, a booster chamber 12 in housing 1 of the power brake unit is first isolated from an unpressurized return reservoir 13 and then connected with a fluid source 14 which acts as an auxiliary energy source.

First booster piston 4 abuts in bore 3 against an intermediate piston 15 which bears against a master cylinder piston 16 through a push rod 16. Rigidly secured to first booster piston 4 on the side close to the brake pedal is a yoke 17 which is connected to an auxiliary piston 18. Auxiliary piston 18 is sealed to and extends axially slidably into second booster piston 5. For this purpose, second booster piston 5 is formed as a cup-shaped piston. A collar 19 at auxiliary piston 18 and a circlip 20 at second booster piston 5 ensure that second booster piston 5 and auxiliary piston 18 can travel in opposite directions only a predetermined amount. Auxiliary piston 18 has an end surface 21 in front of which a pressure chamber 22 is formed in the interior of second booster piston 5. Pressure chamber 22 connects with a fluid port 25 in housing 1 of the brake valve through a bore 23 and an annular chamber 24 independent of the position of second booster piston 5. Fluid port 25 is connected to fluid source 14. A fluid chamber 26 is provided in front of second booster piston 5, this chamber being connected with an intermediate pressure chamber 28 between intermediate piston 15 and first booster piston 4 through a cross bore 27.

The operation of the power brake unit described is as follows: In the illustrated positions of the components, booster chamber 12 connects with return reservoir 13 through a conventional cross bore and a longitudinal bore in valve spool 7 and return port 10. First booster piston 4 and second booster piston 5 are thereby in a right-hand end position when viewing the drawing, that is, in the off position of the brake. When depressing the brake pedal, booster chamber 12 is first isolated from return reservoir 13 and then connected with fluid source 14. The pressure metered into booster chamber 12 acts on both booster pistons 4 and 5. These are then displaced to the left when viewing the drawing. Second booster piston 5 shifts together with auxiliary piston 18, since pressure chamber 22 is pressurized to the high pressure from fluid source 14 which prevents auxiliary piston 18 from moving into second booster piston 5. Thus, both booster pistons 4 and 5 displace fluid. The fluid flows from fluid chamber 26 in front of second booster piston 5 through cross bore 27 into intermediate pressure chamber 28 between intermediate piston 15 and first booster piston 4. As a result, intermediate piston 15 moves away from first booster piston 4 and displaces the master cylinder piston.

If auxiliary energy source 14 fails because of a defect, auxiliary piston 18, on brake actuation, is able to deliver the fluid available in pressure chamber 22 through bore 23 to fluid source 14 so that auxiliary piston 18 is able to move into second booster piston 5. It is, therefore, not necessary for second booster piston 5 to follow the movement of auxiliary piston 18. As a result, second booster piston 5 is not required to deliver fluid from fluid chamber 26 into intermediate pressure chamber 28. First booster piston 4 will, thus, remain in permanent abutment with intermediate piston 15 so that a displacement of the master cylinder piston is possible without a hydraulic fluid transmission ratio.

While I have described above the principles of my invention in connection with specific apparatus it is to be clearly understood that this description is made only by way of example and not as a limitation to the scope of my invention as set forth in the objects thereof and in the accompanying claims.

I claim:

1. A power brake unit for automotive vehicles being activated by a brake pedal and acting upon a master cylinder piston, said unit comprising:
    a booster piston arrangement axially displaceable in a housing containing a brake valve to meter pressure transmitting fluid from an auxiliary energy source into a booster chamber disposed at one end of said arrangement adjacent said brake pedal, the other end of said arrangement providing a boundary for an intermediate pressure chamber being bounded remote from said other end of said arrangement by one of said master cylinder piston and an intermediate piston disposed between said arrangement and said master cylinder piston;
    said arrangement having a hydraulic transmission ratio which is effective between said brake pedal and said master cylinder piston and being disconnectible dependent on the pressure of said auxiliary energy source; and
    said arrangement including
        a first booster piston, and a second booster piston capable of being axially slidable relative to said first booster piston, said relative sliding motion being limited in a direction opposite to the actuating direction of both said first and second booster pistons by a stop disposed in said second booster piston, said second booster piston being held in a given axial position relative to said first booster piston when both said first and second booster pistons are moved in the actuating direction by a pressure chamber formed in said second booster piston connected to said auxiliary energy source.

2. A brake unit according to claim 1, wherein said first and second booster pistons are disposed in a parallel relationship with respect to each other.

3. A brake unit according to claim 2, wherein said second booster piston includes
   a cup-shaped piston having a closed end bore, and
   an auxiliary piston rigidly connected to said first booster piston projecting into said closed end bore,
   said pressure chamber connected to said auxiliary energy source being disposed between the closed end of said closed end bore and the adjacent end of said auxiliary piston, and
   said stop includes
   a circlip disposed in the open end of said closed end bore against which a collar disposed on the adjacent end of said auxiliary piston abuts.

4. A brake unit according to claim 3, wherein said first booster piston has the same diameter as said master cylinder piston.

5. A brake unit according to claim 4, wherein said first booster piston is in alignment with said master cylinder piston.

6. A brake unit according to claim 3, wherein said intermediate piston abuts against the adjacent end of said first booster piston and is coupled to said master cylinder piston, the diameter of said intermediate piston being greater than the diameter of said master cylinder piston and equal to the diameter of said first booster piston.

7. A brake unit according to claim 6, wherein said first booster piston and said intermediate piston are in alignment with said master cylinder piston.

8. A brake unit according to claim 3, wherein said first booster piston is in alignment with said master cylinder piston.

9. A brake unit according to claim 2, wherein said first booster piston is in alignment with said master cylinder piston.

* * * * *